United States Patent [19]

Kawasaki et al.

[11] 4,133,179

[45] Jan. 9, 1979

[54] SOIL STABILIZING METHOD USING AIR BUBBLED SOLIDIFYING SUSPENSION

[75] Inventors: Kenji Kawasaki; Shigeyoshi Miura; Yoshio Minamikawa; Akira Ohashi, all of Osaka, Japan

[73] Assignee: Konoike Construction Co., Ltd., Osaka, Japan

[21] Appl. No.: 825,134

[22] Filed: Aug. 16, 1977

[30] Foreign Application Priority Data

Sep. 2, 1976 [JP] Japan .................................. 51/105592

[51] Int. Cl.$^2$ .............................................. E02D 3/14
[52] U.S. Cl. ...................................... 405/263; 106/89; 106/900
[58] Field of Search ............... 61/35, 36 R, 36 B, 63; 106/287.5 S; 260/DIG. 14; 404/75; 166/295, 293, 294

[56] References Cited

U.S. PATENT DOCUMENTS

| 3,180,098 | 4/1965 | Spencer | 61/36 B |
| 3,802,203 | 4/1974 | Ichise et al. | 61/36 R |

FOREIGN PATENT DOCUMENTS

| 5034846 | 11/1975 | Japan | 61/35 |
| 5039922 | 12/1975 | Japan | 61/35 |
| 361966 | 8/1930 | United Kingdom | 61/35 |

*Primary Examiner*—Mervin Stein
*Assistant Examiner*—Alex Grosz
*Attorney, Agent, or Firm*—Wenderoth, Lind & Ponack

[57] ABSTRACT

A soil stabilizing method by using an air bubbled solidifying suspension or solution, which is jetted into the ground at a high pressure for the formation of solidified soil having homogeneous strength.

4 Claims, No Drawings

SOIL STABILIZING METHOD USING AIR BUBBLED SOLIDIFYING SUSPENSION

This invention relates to a method of solidifying soil and more particularly, to a method of solidifying the soft ground or lowering the permeability of the soft ground by thrusting an injection pipe into the soft ground and jetting an air bubbled solidifying suspension or solution, as a liquid jet of high pressure, from a jetting nozzle at the tip of said injection pipe.

Generally, if the solidifying suspension or solution is jetted into the ground at a high pressure, soil particles within the effective jet length for the hydraulic fracturing are mixed with a liquid solidifying agent due to the penetrating and fracturing force of the liquid jet and also by the mixing and stirring effects of the liquid jet. Thus, soil particles are formed into soil-concrete-like solidified soil.

If the jetting nozzle is pushed down or pulled up while maintaining the jetting direction horizontally, wall-shaped solidified ground is formed in the earth. Furthermore, if the jetting nozzle is pushed down or pulled up as it is rotated, a columnar solidified soil is formed.

In the water or in the earth, however, the dynamic pressure of the liquid jet decreases sharply in proportion to the increase of the jetting distance. Therefore the effective jetting length, or the region in which solidified soil can be formed, is limited to a small extent, e.g. jetting in rotation at a high pressure of 200–300 kg/cm$^2$ into sandy ground (around 10 in N-value) or into clay ground (3–4 in N-value) can only form a columnar solidified soil of 40–50 cm in diameter.

In order to increase the effective jetting area by a liquid jet, it has been proposed to use an injection pipe of the double pipe or multiplex pipe type for supplying the liquid solidifying agent from one pipeline and supplying the air compressed by an air-compressor from the other pipeline and to jet both simultaneously from a jetting nozzle comprising a concentric double-nozzle or triple-nozzle. According to this method, a hydro-fracturing effect by the expanding force of the compressed air acts on the soil around the liquid jet and the effective jet length for the hydraulic fracturing can be extended. However, since the air compressed by a compressor is small in expanding pressure and a large quantity of the air must be fed into the ground as a continuous flow for displaying hydro-fracturing effect, the air flow rises in the ground in the state of large air bubbles, presenting a boiling phenomenon. Thus, it gushes into the upper ground or gushes out from the ground surface, together with the jetted solidifying liquid, with the result that a large quantity of the liquid solidify agent scatters. Consequently, the content of the solidifying agent in the soil is variable and it is impossible to obtain a solidified soil with homogeneous strength. Furthermore, compressed air must be supplied by an air-compressor, and double or a multiple injection pipe will be necessary. For this, large large mechanical equipment is required.

The object of the present invention is to eliminate the above-mentioned disadvantages of the conventional method and to provide a method whereby solidifed soil having homogeneity can be economically formed.

The present invention provides a method of stabilizing soil by using an air bubbled solidifying suspension, whereby a Portland cement-type solidifying suspension or an inorganic or organic solidifying agent is mixed with foamed water which was previously made by stirring the water to which a foaming agent was added. The mixture thus obtained is kneaded for formation of a solidifying suspension or solution containing many microscopic bubbles, which is jetted into the earth at a high pressure of 200 kg/cm$^2$ at the lowest so as to form solidified soil of homogeneity over a wide range of ground. Another method of stabilizing soil by using the air-bubbled solidifying suspension can be utilized, whereby either one or both of a Portland cement-type solidifying agent and a gelation accelerating agent are mixed and kneaded with the bubbled water (previously made by stirring the water to which a foaming agent was added) and both liquid agents are jetted simultaneously, or a mixture of both is jetted, into the ground for formation of solidifed soil of homogeneity over wide range having ground.

When using the air in combination with the liquid jet in order to enhance the destructive power of the liquid jet and to increase the effective jet length for the hydraulic fracturing, the fracturing effect is accelerated to a large extent by increasing the dynamic pressure of the jetting liquid. This is achieved by mixing a large amount of microscopic air bubbles, compressed by a high pressure, together with the jetting liquid and also by the hydraulic cavitation due to the continuous collision of air bubbles with substances to be destroyed. In order to display such effect effectively, it is necessary to include a large quantity of tough microscopic bubbles in the solidifying suspension or solution.

If the water containing 1% foaming agent, in which a compound of an anionic activator and a polyoxyalkylene alkyl ether-type nonionic activator and a polymeric foam stabilizer are compounded, is stirred abruptly, a large quantity of stabilized air bubbles can be produced. If Portland cement is added to this bubbled water and this mixture is kneaded so as to make a cement milk of 1:1 water-cement ratio by weight, a cement suspension of 20–70% (percentage of air bubbles) containing a large quantity of microscopic air bubbles (1 mm. in diameter) can be formed. This cement suspension is jetted out at a high pressure of 200 kg/cm$^2$ at the lowest from an injection pipe nozzle thrust into the ground for which solidifying is desired.

EXAMPLE NO. 1

An injection pipe of 40.5 mm. in diameter was thrust perpendicularly as deep as 8 meters into silty clay ground having an N-value of 2–3 at the reclaimed land of Osaka South Harbour; the above-mentioned air bubbled suspension was pumped by a high pressure plunger pump having a capacity of 200 kg/cm$^2$ pressure and 42 liters/min. discharge volume; the suspension was jetted in a horizontal direction from a nozzle of 2 mm. in diameter which was fixed at the tip of the injection pipe; said injection pipe was pulled up at the speed of 12.5 cm/min. as it was rotated at 20 r.p.m. and thus a columnar solidified soil was formed in the ground. Comparative experiments of such columnar solidified soil were conducted under varying conditions, i.e. by using of conventional Portland cement suspension with no air bubbles and, by increasing the discharge volume by using two plunger pumps and nozzle diameter of 3 mm., with a twofold increase of the pulling up speed. The results of the comparative experiments are as shown in the following table.

|   | Pressure (kg/cm²) | Nozzle diameter (mm) | Speed of revolution (r.p.m.) | Pulling up speed (cm/min.) | Average dia. of solidified soil (cm) |
|---|---|---|---|---|---|
| I   | 200 | 2  | 20 | 12.5 | 50 |
| II  | "   | "  | "  | "    | 90 |
| III | "   | 3. | "  | 25.0 | 65 |
| IV  | "   | "  | "  | "    | 90 |

I and III : Cement + Water (ratio 1 : 1)
II and IV : Cement + Water + Foaming agent (ratio 1 : 1 : 0.01)

As can be seen from the above table, in the cases of II and IV where an air-bubbled Portland cement suspension was used, columnar solidifed soil having a larger diameter than in the cases of I and III was formed.

According to this method, the air bubbles formed are jetted after they are compressed at a pressure of 200 kg/cm². Therefore, the explosive expansion of air bubbles at the time of jetting has a great influence on the effective jet length for the hydraulic fracturing. However, among the air bubbles previously formed in the cement milk, those of large size float on the upper part of the mixing tank and those of microscopic size are sucked into the pump, together with the cement milk. Thus, this method does not require jetting of a large quantity of the compressed air, together with the liquid solidifying agent, by using a double or a triple pipe. Accordingly, this method is free from the boiling phenomenon of a Portland cement suspension. In fact, solidified ground of very high stability could be formed by this method.

EXAMPLE NO. 2

A Portland cement type solidifying agent was mixed and kneaded with the bubbled water made previously by stirring the water to which a foaming agent was added. While the cement milk containing microscopic air bubbles thus obtained was pumped by a high pressure pump, a water glass type gelation accelerating agent solution was pumped by the other pump and two liquids were merged into a mixture liquid at the mixing head part. This mixture was jetted into the ground from a jetting nozzle. The result was the same as in the case of Example No. 1, namely, columnar solidified soil of larger diameter was formed.

As mentioned above, according to the present invention, a solidifying suspension or solution having air bubbles made previously by using a foaming agent is jetted into the ground as a liquid jet of high pressure. Therefore, the present invention does not require the use of any of double pipe, triple pipe, water swivel with double inlets or an air-compressor. Moreover, as the microscopic and uniform air bubbles are formed in the suspension or solution by the use of a foaming agent, the fracturing effect by a jet is very large. The present invention is free from the turbulent action at the surrounding ground due to discharge of excess air and the solidifying agent, making it possible to carry out soil stabilizing effectively and economically and also to construct cut-off walls. Furthermore, the present invention makes it possible to extend the effective jet length for the hydraulic fracturing in the ground to the maximum extent within the range defined by the discharge pressure and discharge volume and to form solidified ground of high homogeneity. The present invention is of extreme significance in that it makes it possible to accelerate the epochmaking development in the soil stabilizing method whereby a solidifying agent is jetted into the ground for formation of the underground walls and support base.

What is claimed is:

1. In a method of solidifying the soil by injecting into the soil an aqueous suspension of an organic or inorganic solidifying agent, conventionally used to solidify the soil, under air pressure by means of an injection pipe underneath the soil, the improvement which comprises (1) preparing a suspension of an organic or inorganic solidifying agent by first mixing a foaming agent with water and stirring to initially produce an aqueous mixture containing a large quantity of air bubbles; adding an organic or inorganic solidifying agent thereto and then kneading the mixture to produce a suspension containing air bubbles in an amount of 20-70%, a large quantity of said air bubbles being of microscopic size and (2) then injecting this suspension through said injection pipe into the soil at a high pressure of at least 200 Kg/cm² by means of a high pressure pump to homogeneously solidify the soil over a wide area.

2. A method according to claim 1, wherein the foaming agent is used in an amount of 1% and wherein the inorganic solidifying agent is Portland cement used in an amount such that the ratio of water to the Portland cement is 1:1.

3. A method according to claim 2, wherein the foaming agent and water combination initially prepared also contains an anionic activator and a polyoxyalkylene alkyl ether nonionic activator in addition to a polymeric foam stabilizer.

4. A method according to claim 2 in which an aqueous solution of a water glass gelation accelerating agent by means of another pump is pumped into the suspension of solidifying agent and mixed with the suspension of Portland cement solidifying agent at a mixing head and the mixture of solidifying agent and gelatin accelerating agent are then injected into the soil through the injection pipe.

* * * * *